June 26, 1962 L. E. HOVENKAMP 3,041,103
VEHICLE STAKE LOCKING MEANS
Filed July 19, 1960 2 Sheets-Sheet 1
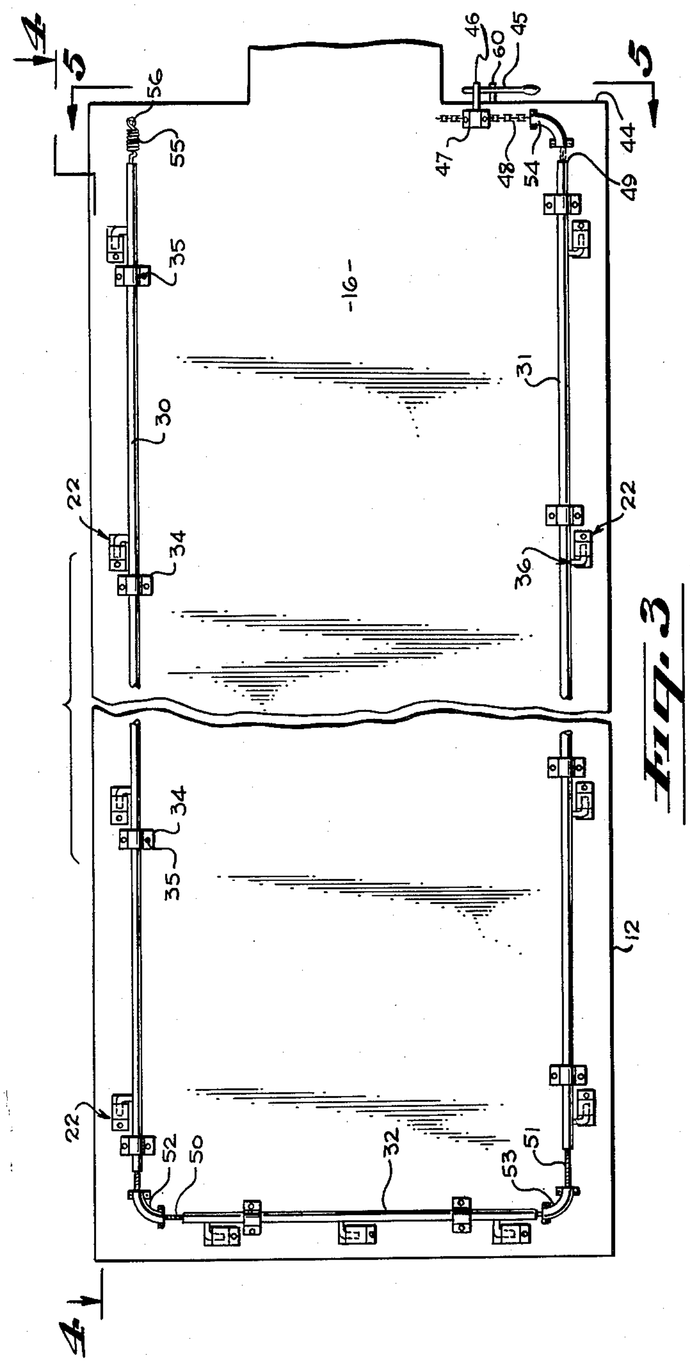
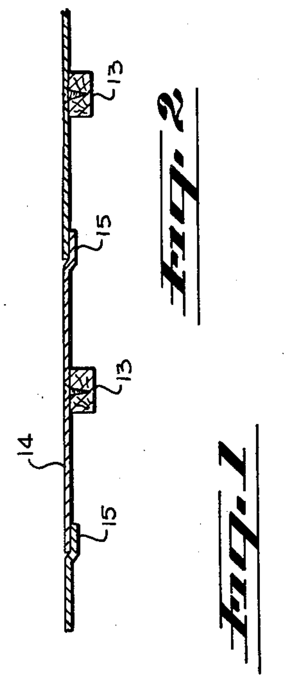
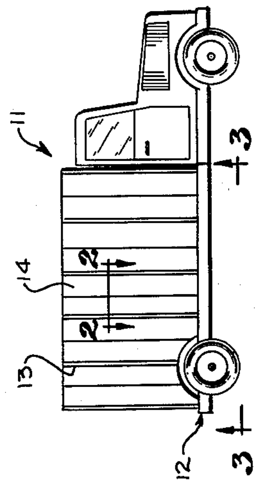
INVENTOR.
LAURENCE E. HOVENKAMP
BY Mason & Graham
ATTORNEYS VEHICLE STAKE LOCKING MEANS
Filed July 19, 1960
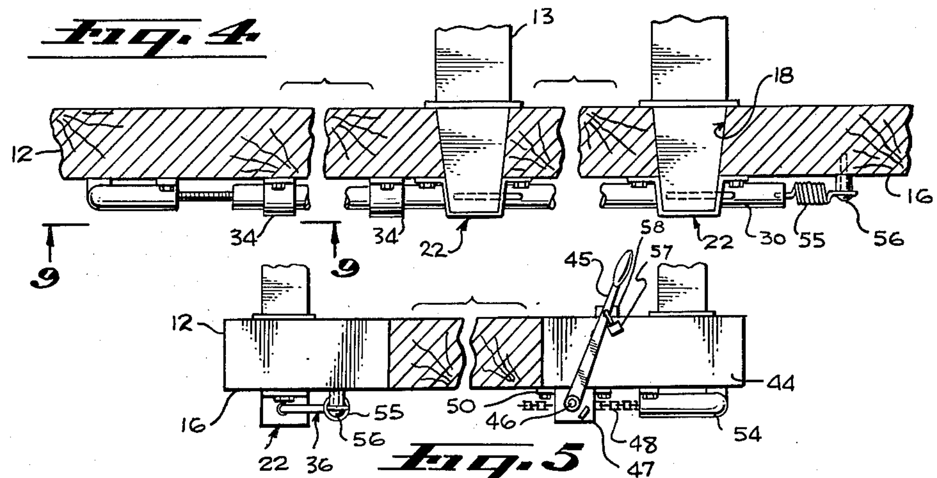
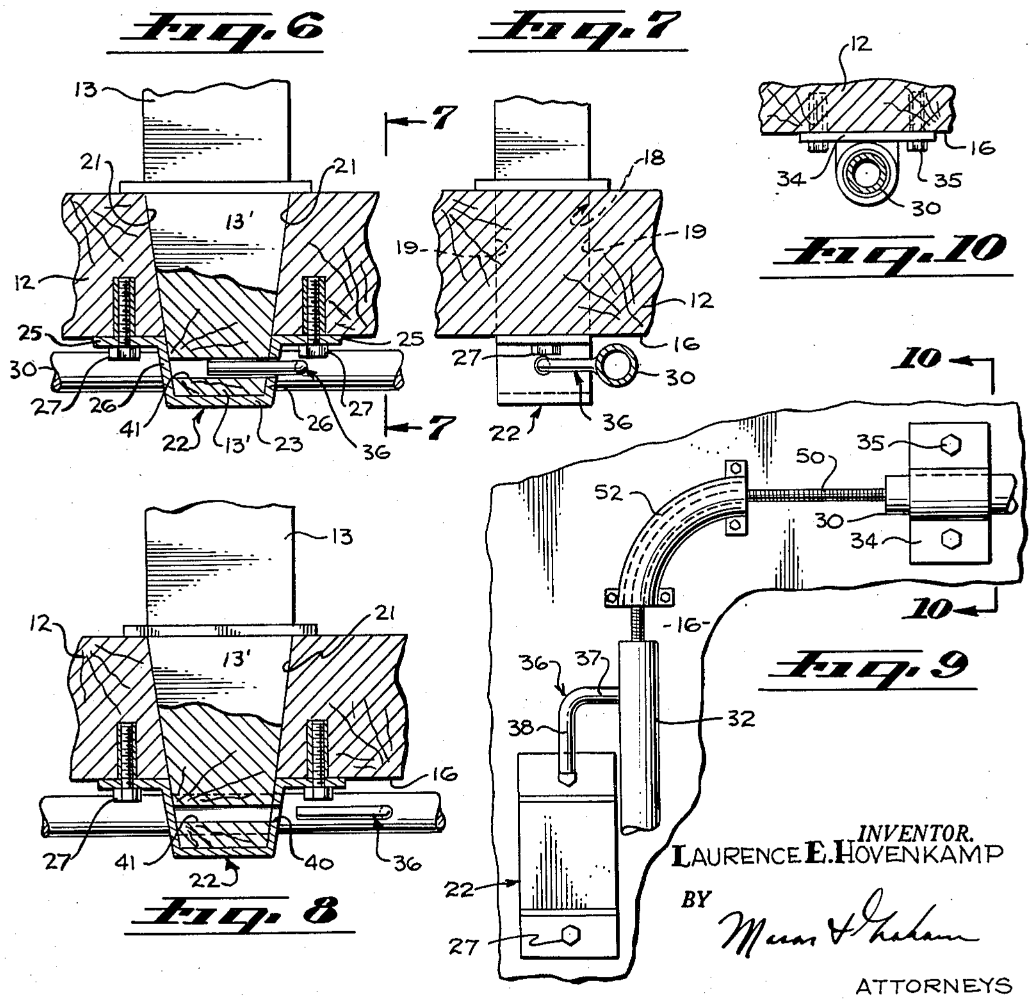

United States Patent Office 3,041,103

Patented June 26, 1962

1

3,041,103

VEHICLE STAKE LOCKING MEANS

Lawrence E. Hovenkamp, 9818 S. Hoover St., Los Angeles County 44, Calif.

Filed July 19, 1960, Ser. No. 46,861
5 Claims. (Cl. 296—43)

This invention has to do with vehicles having a flat bed-type body provided with holes or pockets for receiving stakes and particularly with means for releasably locking the stakes in place.

An object of the invention is to provide novel means for releasably locking stakes in the stake pockets of a vehicle body, such as the bed of a truck.

A further object is to provide novel means for releasably, simultaneously locking stakes on three sides of the vehicle bed whereby a single actuating member can be operated to lock or release all of the stakes.

Another object is to provide means of the type indicated of simple construction which is economical to manufacture and easy to install.

Still another object is to provide a novel panel-type stake construction making it possible to enclose the bed of a truck up to a given height with means which can be locked in place.

These and other objects will be apparent from the drawings and the following description. Referring to the drawings:

FIG. 1 is a side elevational view of a truck having a flat bed body with stakes therein, the particular stakes shown having panels attached thereto;

FIG. 2 is a fragmentary sectional view on line 2—2 of FIG. 1, but on a larger scale;

FIG. 3 is an inverted plan view showing the underside of the bed of the vehicle and showing the means embodying the invention for releasably securing the stakes.

FIG. 4 is a fragmentary sectional view on line 4—4 of FIG. 3, but on a larger scale;

FIG. 5 is a fragmentary cross sectional view on line 5—5 of FIG. 3;

FIG. 6 is a fragmentary sectional detail view through the lower end of one stake and stake pocket.

FIG. 7 is a sectional view on line 7—7 of FIG. 6;

FIG. 8 is a view similar to FIG. 6 but showing the parts in a different position;

FIG. 9 is a fragmentary inverted plan view at one corner of the truck body; and

FIG. 10 is a sectional view on line 10—10 of FIG. 9.

More particularly describing the invention, in FIG. 1 I show a vehicle of the type to which the invention is adapted to be applied, namely, a truck 11 having a flat bed-type body 12 in which stakes 13 are mounted. In the particular structure shown the stakes are provided with panels 14 having offset end portions 15 to form overlapping joints between panels thereby providing an unbroken wall completely enclosing the sides and rear of the truck body to a given height. However, it will be understood that the invention may be applied to any type of stakes whether mounted singly or in groups of two or more stakes connected by cross members.

Referring particularly to FIGS. 2–10, the means of the invention is shown mounted beneath or on the underside 16 of the bed 12 of the truck. The truck body or bed itself is provided with a plurality of stake-receiving holes 18. These are shown as having opposed vertical sides 19 and opposed downwardly converging sides 21. Beneath the holes 18 are straps 22 having central portions 23 forming a bottom for the holes and thus cooperating therewith to form pockets for the reception of the tapered lower ends 13' of the stakes. Each strap 22 has two apertured end sections 25 and converging side sections 26 which form a continuation of the sides 21 of holes 18. Screws 27 serve to mount the straps.

2

For the purpose of locking or securing the stakes in the pockets I provide a locking bar adjacent each row of stake pockets. Thus I provide the locking bars 30 and 31 down each side or along each side of the truck body and the bar 32 across the rear of the bed. These bars are mounted for longitudinal movement in brackets 34 secured to the truck bed by screws 35. Each of the bars is provided with a finger 36 for each stake pocket. The fingers are formed somewhat in the nature of a hook, each having a short section 37 projecting laterally of the bar and an elongated section 38 which parallels the bar. The latter is adapted to be received in an opening 40 in the wall of a strap 22 and an opening or hole 41 in the stake. Thus when the locking bars are in the position in which they are shown in FIGS. 3, 6 and 7, the stakes are secured or locked in place and cannot be removed.

In order to actuate the bars I provide a handle 45 at the forward end of the truck body which is pivotally mounted at 46. The inner end of the handle is connected by a "cumalong" mechanism to a chain 48 secured to the forward end of bar 31. The bars themselves are connected at their adjacent ends by cables 50 and 51, which pass through guide tubes 52 and 53 respectively, mounted at the two corners of the truck body, as best shown in FIGS. 3 and 9. Chain 48 passes through such a tube, designated 54.

In order to yieldably urge the three rods to a position such that the stakes are not secured or locked in place, I provide a tension spring 55 at the forward end of rod 30, and the spring is anchored to the rod and to the truck bed at 56.

It will be apparent that in the operation of the device the locking bars are moved to locked position by the handle 45. Any suitable means can be employed for locking the handle against manipulation by an unauthorized person and by way of example I show a padlock 57 and a bracket 58 for the purpose. Also any suitable means can be provided to prevent the bars from rotating such that the fingers 36 and holes in the stake pockets and stakes would not be in alignment.

Although I have illustrated and described preferred forms of my invention, I contemplate that various changes and modifications can be made therein without departing from the invention, the scope of which is indicated by the following claims. For example, the functions of the spring 55 and handle 45 can be reversed, if desired.

I claim:

1. In a vehicle having a rectangular flat bed-type body provided with a plurality of stake-receiving pockets along three marginal edges said pockets being disposed in rows, a locking bar for each row of pockets mounted for longitudinal movement on said body, said bars being disposed adjacent said rows of pockets respectively, stakes received in pockets, interengaging means on said bars and said stakes for releasably securing said stages to the bars, flexible connection means between adjacent ends of said bars, and means yieldably urging said bars to a given position.

2. The construction set forth in claim 1 in which the means yieldably urging said bars to a given position comprises a spring operably connected to one of said bars and to the body of said vehicle.

3. In a vehicle having a rectangular flat bed-type body provided with a row of stake pockets along each side marginal area thereof and with a row of stake pockets along an end marginal area thereof, a locking bar adjacent each row of pockets, means mounting each of said bars on said body for movement longitudinally of itself, stakes received in said pockets, interengaging means on said bars and stakes releasably securing said stakes against removal from said stake pockets, flexible connection means between adjacent ends of said bars, spring means yieldably urging said bars as a unit to a given position, and means for operating said bars connected to one of said bars.

4. The construction set forth in claim 3 in which the operating means is connected to the free end of one of the locking bars adjacent a side marginal area of the body and in which the spring means is connected to the free end of the other locking bar along the other side marginal area of the body.

5. The construction set forth in claim 3 in which the flexible connection means between adjacent bars comprises a cable and in which a curved guide tube is mounted on the body between the adjacent ends of the bars and receives the cable connecting the adjacent bars.

References Cited in the file of this patent

UNITED STATES PATENTS

| | | |
|---|---|---|
| 834,702 | Bagley | Oct. 30, 1906 |
| 866,344 | Dyer | Sept. 17, 1907 |
| 995,633 | Peterson | June 20, 1911 |
| 1,083,118 | Mauch et al. | Dec. 30, 1913 |
| 1,250,314 | Herron | Dec. 18, 1917 |